Figure 1:
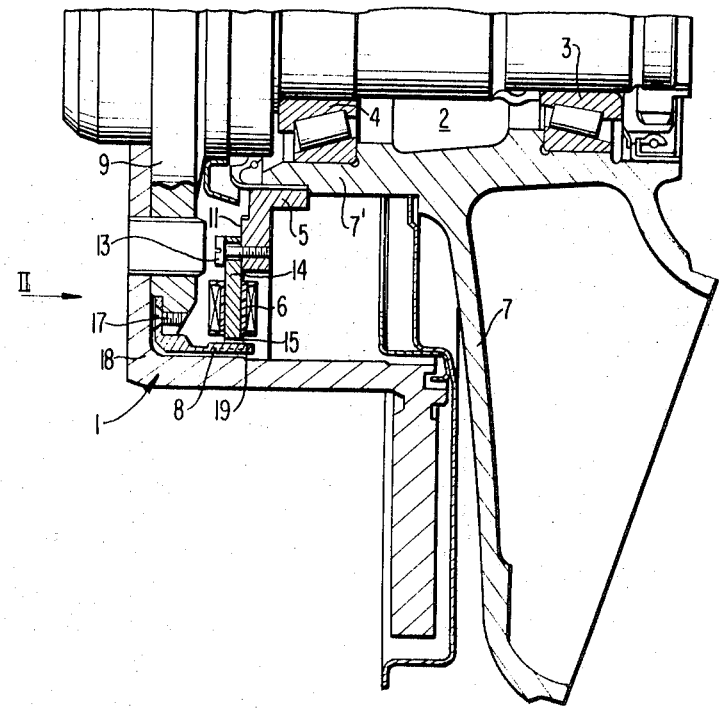

United States Patent
Burckhardt et al.

[15] 3,653,471
[45] Apr. 4, 1972

[54] INSTALLATION FOR THE BRAKE-LOCKING PREVENTION IN VEHICLES

[72] Inventors: Manfred H. Burckhardt, Waiblingen; Paul Schwerdt, Esslingen-Hegensberg, both of Germany

[73] Assignee: Daimler-Benz Aktiengesellschaft, Germany

[22] Filed: Mar. 13, 1970

[21] Appl. No.: 19,382

[30] Foreign Application Priority Data

Mar. 19, 1969 Germany............................P 19 13 814.8

[52] U.S. Cl. ...........................188/181 A, 73/519, 324/174
[51] Int. Cl. ..................................................B60t 8/08
[58] Field of Search..........................188/180, 181 A, 181 C; 303/21 C, 21 CE, 21 CF, 21 CG; 73/488, 517 A, 519; 324/167, 174

[56] References Cited

UNITED STATES PATENTS

| | | | |
|---|---|---|---|
| 3,017,145 | 1/1962 | Yarber | 188/181 A X |
| 3,233,946 | 2/1966 | Lockhart | 303/21 CE |
| 3,469,662 | 9/1969 | Dewar | 188/181 A |
| 3,473,120 | 10/1969 | Ruof | 324/174 X |

*Primary Examiner*—Duane A. Reger
*Attorney*—Craig, Antonelli & Hill

[57] ABSTRACT

An installation for preventing the locking of the brakes in vehicles, in which sensing elements are provided at the wheels that produce an output signal corresponding to the wheel rotational speed which is fed to a common comparator; the sensing members are each arranged within the area of the wheel mounting outside of the inner and outer wheel bearing.

20 Claims, 2 Drawing Figures

INVENTORS
MANFRED H. BURCKHARDT
PAUL SCHWERDT

BY

ATTORNEYS

INSTALLATION FOR THE BRAKE-LOCKING PREVENTION IN VEHICLES

The present invention relates to an installation for the brake-locking prevention in vehicles, preferably in motor vehicles, in which sensing members are provided at the wheels which produce an output signal corresponding to the wheel rotational speed to a common comparator apparatus.

These types of installations serve to prevent the blocking or locking of individual wheels, for example, during the braking of the vehicle so that the driving safety of the vehicle is increased.

Installations are already known in the prior art which supply a signal corresponding to the rotational speed of the wheel to a common comparator. These prior art installations, however, entail the disadvantage that they are constructively very expensive and require a constructive change of the wheel suspension and wheel mounting. Additionally, these prior art installations are poorly accessible and are not sufficiently protected against corrosion and damaging during the assembly and disassembly of the wheels. Furthermore, an optimum circular movement cannot be assured by reason of the large distance of the installation from the wheel mounting so that errors in the pulse transmission may occur which jeopardize the function of the brake locking prevention installation.

The present invention aims at avoiding the described disadvantages and to arrange the sensing members designated as sensors at the wheels well accessible in such a manner that the constructive realization of the wheel suspension and wheel mounting is not influenced and a safe pulse transmission takes place also with strongly changing or alternating wheel forces.

The underlying problems are solved according to the present invention in that the sensing members are arranged each within the area of the wheel mounting outside of the inner and of the outer wheel bearing.

This arrangement of the sensing members offers the advantage that the constructive realization of the wheel mounting need not be changed, and that the sensing member is conveniently accessible in case of need without opening the wheel support or mounting. The sensing members are constructed, for example, as frequency generators and the stator accommodating the coils is then mounted in the fixed part of the wheel mounting and the rotor at the rotating part of the wheel mounting. It is appropriate to mount the stator at the fixed part of the wheel mounting. It is appropriate to mount the stator at the fixed part of the wheel bearing support or mounting, for example, at the wheel hub because the electric lines from the coil or winding can then be lead off in a simple manner to the common comparator. Thus, sliding brushes or slip rings subject to wear are avoided.

According to the present invention, the stator may be equipped with two or preferably four windings so that even smallest deformations, which occur at the teeth between stator and rotor, for example, during curve drives as a result of large wheel forces and which cause a change of the induction and consequently possibly lead to errors in the pulse transmission, are compensated. The series connected coils or windings, whose electric phase shift is no larger than 90°, thereby supply to the comparator a common voltage which represents the sum of the voltage portions of the individual coils or windings.

The stator appropriately has the shape of one or several ring-shaped, separable clamping flanges, held together by means of screws or the like, which with the inner diameter thereof, are clamped on the end disposed at the outer wheel bearing of the fixed or stationary wheel hub support and which include along the outer diameter thereof, several projecting yoke mountings or supports corresponding to the number of coils or windings, that are distributed uniformly over the circumference of the clamping flanges. This type of construction of the stator offers the advantage of a simple manufacture, and additionally, parts of the stator may be mutually interchanged in a simple manner since they are easily accessible during assembly or disassembly.

An approximately U-shaped yoke is secured at each yoke mounting of the clamping flange by means of a threaded connection or the like, whose two leg portions which are provided with teeth at the end thereof, project approximately concentrically toward the outside. The threaded connection has the advantage that the U-shaped yoke carrying the teeth can be adjusted with respect to the teeth of the rotor.

In order to achieve a compensation of the voltages produced by the coils, the coil bodies which support the coil winding, are so arranged on one of the two yoke legs that two coils are each disposed concentrically opposite one another.

According to the present invention, the rotor associated with the coil set advantageously has the shape of a bell which is secured by means of a threaded connection or the like at the wheel flange of the drive shaft inside of the brake disc member and is provided at its inner circular surface with teeth. The rotor is so arranged at the wheel flange in an advantageous manner that it is enclosed by the brake disc member and consequently is not damaged during the disassembly of the wheel.

The number of teeth of the mutually oppositely disposed inner and outer teeth of the coil set is according to a preferred embodiment the same or is constructed at an integral ratio, preferably at the ratio of 1 : 2. The number of teeth is to be as large as possible and generally 500 teeth are provided per each toothed arrangement. However, in a special type of construction of the present invention, there also exists the possibility to provide on one part of the coil set, half the number of teeth if the full number of teeth is present on the other part so that at the output of the sensing member, a number of pulses corresponding to this full number is produced. It is advantageous if the toothed arrangements of the stator and rotor are covered or coated with an anti-magnetic protective layer by means of an anti-magnetic material of any known type, for example, Araldite, a casting resin, molybdenum, etc. It is prevented thereby that magnetic abrasion or dust, which stems, for example, from the roller bearings, can deposit itself at the teeth and thereby might disturb the proper function of the coil set so that the full pulse number is not transmitted.

Accordingly, it is an object of the present invention to provide an installation for the brake locking prevention in vehicles which avoids by simple means the aforementioned shortcomings and drawbacks encountered in the prior art.

Another object of the present invention resides in an installation for preventing the brake locking in vehicles which is simple in construction and requires no constructive changes in the wheel suspension or wheel mounting.

A further object of the present invention resides in an installation for the brake locking preventing in vehicles which is not only easily accessible as well as simple to assemble and disassemble but additionally is protected against corrosion and damages during assembly and disassembly of the wheel.

Still a further object of the present invention resides in an installation of the type described above which increases the reliability of operation and minimizes errors in the output thereof.

Another object of the present invention resides in an installation for the brake locking prevention of motor vehicles which eliminates the wear of parts and thus increases the length of life of the installation.

Figure 2:
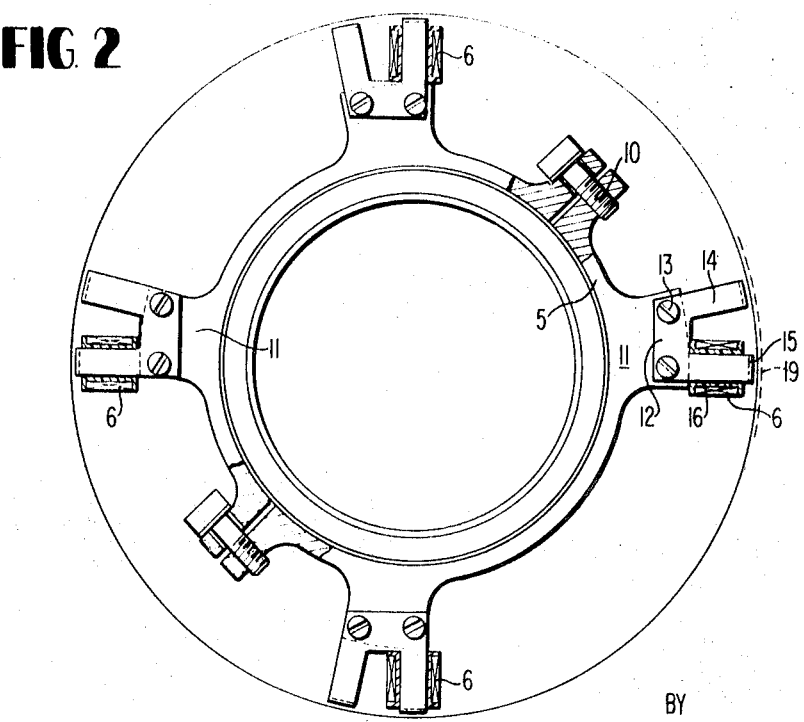

These and further objects, features, and advantages of the present invention will become more obvious from the following description when taken in connection with the accompanying drawing which shows, for purposes of illustration only, one embodiment in accordance with the present invention, and wherein:

FIG. 1 is a longitudinal cross-sectional view through the wheel mounting or a rear axle in accordance with the present invention; and FIG. 2 is an elevational view, taken in the direction of arrow II in FIG. 1, of the coil set according to the present invention.

Referring now to the drawing wherein like reference numerals are used throughout the two views to designate like parts, and more particularly to FIG. 1, the arrangement of the sensing member generally designated by reference numeral 1 in this figure is illustrated outside of the lubricant or grease space 2 which is disposed between the inner wheel bearing 3 and the outer wheel bearing 4. The sensing member 1 constructed as frequency generator consists of the stator 5 with the coil or coils 6 which is mounted at or on the fixed part 7 of the wheel mounting; namely, the wheel hub support, and of the rotor 8 which is mounted at the rotating part 9 of the wheel mounting; namely, the wheel flange of the wheel axle shaft.

It can be seen from FIG. 2 that the stator 5 is constructed as annularly shaped, two-partite clamping flange held together by means of screws 10 which is clamped with its inner diameter over the end 7' of the fixed wheel hub support 7 disposed near the outer wheel bearing 4, and which includes at its outer diameter several projecting yoke mountings 11 corresponding to the number of coils 6, that are uniformly distributed over the circumference of the clamping flange.

Approximately U-shaped yokes 12 are secured at the yoke-mountings 11 of the clamping flange corresponding to the number thereof, by means of threaded connections 13; the two leg portions 14 of the yokes 12 which are provided at the end thereof with a toothed arrangement 15, extend approximately concentrically outwardly. The coil bodies 6 which carry the coil windings 6 are each so arranged on one of the two yoke legs 14 that two coils 6 are each disposed concentrically mutually opposite one another.

It can be seen in FIG. 1 that the rotor 8 has the shape of a bell which is secured by means of a threaded connection but at the wheel flange 9 of the drive shaft inside of the brake disc body 18 and is provided at its inner surface with a toothed arrangement 19. The number of teeth of the oppositely disposed internal teeth 19 and external teeth 15 of the coil set 1 is identical or constructed at an integral ratio, preferably at the ratio 1 : 2.

While we have shown and described only one embodiment in accordance with the present invention, it is understood that the same is not limited thereto but is susceptible of numerous changes and modifications as known to those skilled in the art, and we therefore do not wish to be limited to the details shown nd described herein but intend to cover all such changes and modifications as are encompassed by the scope of the appended claims.

We claim:

1. An installation for the brake locking prevention of vehicles, in which sensing means are provided at the wheels producing an output signal corresponding to the wheel rotational speed, and in which a wheel mounting means including inner and outer bearing means rotatably support a respective wheel, characterized in that the sensing means are each arranged within the area of the wheel mounting outside of the inner and of the outer wheel bearing means, each sensing means being constructed as a frequency generator including a stator and a rotor, the stator being mounted at a relatively fixed part of the wheel mounting means and the rotor at a rotating part of the wheel bearing means, several coil means being mounted on the stator, the stator having the shape of a clamping flange means which is clampingly mounted with its inner diameter on the end disposed near the outer wheel bearing means of a fixed wheel hub support, said clamping flange means being provided at its outer diameter with several projecting yoke mountings corresponding to the number of coil means which are distributed substantially uniformly over the circumference of the clamping flange means.

2. An installation according to claim 1, characterized in that the clamping flange means includes several ring-shaped, separable parts held together by a threaded connecting means.

3. An installation according to claim 1, characterized in that an approximately U-shaped yoke means is threadably secured at each yoke mounting of the clamping flange means, each yoke means including two leg portions provided at the outer ends with teeth, and said leg portions extending outwardly approximately concentrically.

4. An installation according to claim 3, characterized in that the coil means include coil elements which carry coil windings and are so arranged on one of the two yoke leg members of a yoke means that two coil means each are disposed mutually opposite one another, substantially concentrically.

5. An installation according to claim 4, characterized in that the rotor has the shape of a bell which is threadably secured at a wheel flange of a drive shaft on the inside of a brake disc body and is provided at its inner surface with teeth.

6. An installation according to claim 5, characterized in that the number of the mutually oppositely disposed internal and external teeth of a coil set is the same.

7. An installation according to claim 5, characterized in that the number of teeth of the mutually opposite internal and external teeth of a coil set are constructed at an integral ratio.

8. An installation according to claim 7, characterized in that the ratio is 1 : 2.

9. An installation according to claim 5, characterized in that an anti-magnetic material coats the teeth of the stator and rotor with an anti-magnetic protective layer.

10. An installation according to claim 9, characterized in that the clamping flange means includes several ring-shaped, separable parts held together by a threaded connecting means.

11. An installation according to claim 10, in which the output of the wheels of a motor vehicle are supplied to a common comparator.

12. An installation for the brake locking prevention of vehicles, in which sensing means are provided at the wheels producing an output signal corresponding to the wheel rotational speed, and in which a wheel mounting means including inner and outer bearing means rotatably support a respective wheel, characterized in that the sensing means are each arranged within the area of the wheel mounting outside of the inner and of the outer wheel bearing means, each sensing means being constructed as a frequency generator including a stator and a rotor, the stator being mounted at a relatively fixed part of the wheel mounting means and the rotor at a rotating part of the wheel bearing means, the stator having the shape of a clamping flange means which is clampingly mounted with its inner diameter on the end disposed near the outer wheel bearing means of a fixed wheel hub support, said clamping flange means being provided at its outer diameter with several projecting yoke mountings which are distributed substantially uniformly over the circumference of the clamping flange means.

13. An installation according to claim 12, characterized in that the clamping flange means includes several ring-shaped, separable parts held together by a threaded connecting means.

14. An installation according to claim 12, characterized in that an approximately U-shaped yoke means is threadably secured at each yoke mounting of the clamping flange means, each yoke means including two leg portions provided at the outer ends with teeth, and said leg portions extending outwardly approximately concentrically.

15. An installation according to claim 14, characterized in that the coil means include coil elements which carry coil windings and are so arranged on one of the two yoke leg members of a yoke means that two coil means each are disposed mutually opposite one another substantially concentrically.

16. An installation according to claim 13, characterized in that the rotor has the shape of a bell which is threadably secured at a wheel flange of a drive shaft on the inside of a brake disc body and is provided at its inner surface with teeth.

17. An installation according to claim 13, characterized in that the number of the mutually oppositely disposed internal and external teeth of the frequency generator is the same.

18. An installation according to claim 13, characterized in that the number of teeth of the mutually opposite internal and external teeth of the frequency generator are constructed at an integral ratio.

19. An installation according to claim 18, characterized in that the ratio is 1 : 2.

20. An installation according to claim 13, characterized in that an anti-magnetic material coats the teeth of the stator and rotor with an anti-magnetic protective layer.

* * * * *